United States Patent [19]

Beranek

[11] 4,297,321

[45] Oct. 27, 1981

[54] APPARATUS HAVING MAIN AND AUXILIARY FLUIDIZED BEDS THEREIN

[75] Inventor: Jaroslav Beranek, Prague, Czechoslovakia

[73] Assignee: Ceskoslovenska Akademie Ved, Prague, Czechoslovakia

[21] Appl. No.: 138,323

[22] Filed: Apr. 8, 1980

[30] Foreign Application Priority Data

Apr. 10, 1979 [CS] Czechoslovakia ............... 2441-79

[51] Int. Cl.$^3$ .......................... B01J 8/28; B01J 8/44; F27B 15/08
[52] U.S. Cl. ................................. 422/143; 110/244; 422/145; 432/58
[58] Field of Search ............... 422/145, 143; 34/10, 34/57 A; 432/15, 58; 122/4 D; 110/243, 244

[56] References Cited

U.S. PATENT DOCUMENTS

| | | | |
|---|---|---|---|
| 3,242,195 | 3/1966 | Way | 422/143 |
| 3,998,929 | 12/1976 | Leyshon | 422/143 |
| 4,021,927 | 5/1977 | Idaszak | 110/244 |
| 4,176,623 | 12/1979 | Blaskowski | 110/244 |

Primary Examiner—Bradley Garris
Attorney, Agent, or Firm—Burgess, Ryan and Wayne

[57] ABSTRACT

The invention concerns the method of feeding particles at multiple points into a fluidized bed by forming at least one auxiliary fluidized bed of the particles and fluidization fluid from which the particles in fluidized state are introduced through a system of inlets into the main fluidized bed. The invention relates to equipment for performing the method consisting of at least one chamber for formation of the auxiliary fluidized bed including the inlet of solid particles and a grid for the inlet of fluidization fluid, and a chamber for the main fluidized bed including the inlet of fluidization fluid, and a system of inlet pipes by which both chambers are mutually interconnected. The system of inlet pipes has the cross-sectional area smaller than 10% of the horizontal cross-sectional area of the main fluidized bed.

4 Claims, 2 Drawing Figures

APPARATUS HAVING MAIN AND AUXILIARY FLUIDIZED BEDS THEREIN

The invention concerns a method and equipment for simultaneous feeding of particles at multiple points to a fluidized bed.

A single particle introduction point for feeding a fluidized bed is usually insufficient for operations in chemical or physico-chemical processes in fluidized beds with large cross-sectional areas. The low horizontal intensity of mixing motion of the particles in a fluidized bed causes the physical and chemical processes between fluidization fluid and fluidized particles in the vicinity of their inlet to differ from those at points farther away from the point of inlet of particles. An example is the combustion of solid fuels in a fluidized bed combustor, where in vicinity of the inlet of the solid particles, a reduction atmosphere can occur while at locations further away from the inlet of the particles, an oxidation atmosphere with a considerable excess of oxygen can occur.

This non-uniform distribution of particles results in a non-uniform distribution of temperatures of the fluidized bed in the horizontal direction. When a sufficiently uniform distribution of the concentration field of the reacting fuel has been arranged for and thus of course also the uniform distribution of temperatures over the whole cross-sectional area of the fluidized bed has been achieved, it is necessary to feed the fuel at multiple points to the fluidized bed so that its distribution over the whole area of the fluidized bed becomes as uniform as possible.

At present, two methods and corresponding equipment for uniform distribution of particles to a fluidized bed are known. They are the pneumatic transport of particles to the fluidized bed or mechanical spreading of particles on the surface of the fluidized bed. (Biswas B. K., Belay J. V., *An Investigation of Alternative Feed Systems for Utility-Scale Fluidization Bed Steam Generator* 5th Int. Conf. on Fluidized Bed Combustion, Washington, December 1977).

The pneumatic transport of particles to the fluidized bed is based on their transport from the bunkers by gravity fall or by blade feeder with corresponding conical pipes over the whole area of the fluidized bed, while the distribution of the particle from the main stream into a large number of particular streams is performed mechanically. The number of these particular streams can be up to several hundreds for one combustor. To prevent caking or plugging of the injection pipes by fuel particles, the pipes are equipped with mechanical vibrators. The pneumatic system of particle feed to a fluidized bed comprises tees. The particles enter from one side, and pressurized air which introduces the particles to the fluidized bed enters from the other side of the tee. The actual arrangement of these feed systems is not unique, and there are various other ways they can be arranged. The system of inlet pipes either passes through the side walls of the fluidized bed combustor or reactor or through its bottom. This system is very complex and requires a prescribed size of particles. Difficulties arise when feed particles containing moisture must be handled.

Mechanical spreading of particles over the surface of the fluidized bed requires one or more simple spreader stoker feed systems placed on the side walls of the fluidized bed reactor, through which the particles are thrown over the surface of the fluidized bed. This method is very simple but has many disadvantages. First of all, the particles are distributed over the surface of the fluidized bed. Since the larger particles have greater mass, they will tend to accumulate on the surface of the fluidized bed at locations in the reactor farther from the spreader stokers, while the finer, smaller particles will fall into the reactor nearer the spreader stokers. Moreover, the finest particles are carried from the equipment before they reach the surface of the fluidized bed. Thus, the finest particles have a shorter reaction time in the equipment as compared to the particles of the fluidized bed, and thus the chemical reactions between fluidization fluid and particles take place with lower efficiency. Distribution of particles according to their sizes in the space over the surface of the fluidized bed leads to non-uniform granulometric composition of the fluidized bed and thus to non-uniform course of physical and chemical reaction at various locations of the fluidized bed in cases when the rate of this process depends on the size of particles.

SUMMARY OF THE INVENTION

According to the present invention, there is provided a method of feeding the particles at multiple points to the main fluidized bed, whose principle is based on formation of at least one auxiliary fluidized bed consisting of particles and fluidizing fluid from which the particles in a fluidized state are carried through a system of inlet tubes into the main fluidized bed.

To deliver and distribute the particles uniformly over the whole cross-sectional area of the fluidized bed according to the present invention, the fluidized bed is divided in two, i.e., to a main fluidized bed, in which the chemical reaction takes place, and an auxiliary fluidized bed which ensures uniform distribution of particles into the fluidized bed. In the auxiliary fluidized bed, a uniform distribution of particles takes place over the whole cross-sectional area of the reacting fluidized bed while into this auxiliary fluidized bed is introduced only such amount of fluidizing fluid which is necessary to keep the particles in the fluidized state and carry them through the inlets into the main fluidized bed. Into the main fluidized bed is introduced an additional amount of fluidizing fluid necessary for keeping the particles in the fluidized state and for carrying on the corresponding chemical reaction which can be combustion. The method for feeding the particles at multiple points to the fluidized bed is performed in equipment which consists in principle of at least one chamber for formation of the auxiliary fluidized bed equipped with an inlet for particles and a grid for the fluidizing fluid and a chamber for the main fluidized bed, equipped with an inlet for the fluidizing fluid and a system of inlets which mutually interconnect both chambers. The chambers for formation of the auxiliary fluidized bed are mutually interconnected by a system of inlets which have a maximum of 10% of the cross-sectional area of the horizontal cross-sectional area of the main fluidized bed. The sum of all auxiliary fluidizing beds is smaller or equal to the cross-sectional area of the main fluidized bed.

The advantage of this method of feeding the particles is in the simplicity of the equipment in comparison with the equipment required for the mechanical distribution of the stream of fed particles. Another advantage is that all particles must pass through the fluidized bed. Different distribution of particles of various sizes does not take place at their inlet into the fluidized bed as is usual in mechanical spreading of particles over the surface of the fluidized bed.

In comparison with the pneumatic method of feeding particles into the fluidized bed, the proposed method is advantageous in that individual fuel inlets are not plugged due to fuel moisture. The equipment according to the invention does not require a large number of other equipment such as vibrators and the like.

BRIEF DESCRIPTION OF THE DRAWINGS

One of the possible concrete arrangements of the invention is schematically demonstrated in FIGS. 1 and 2, where in FIG. 1 is the section view through the equipment for the inlet of particles at multiple points of the fluidized bed.

DESCRIPTION OF THE PREFERRED EMBODIMENTS

Figure 1:
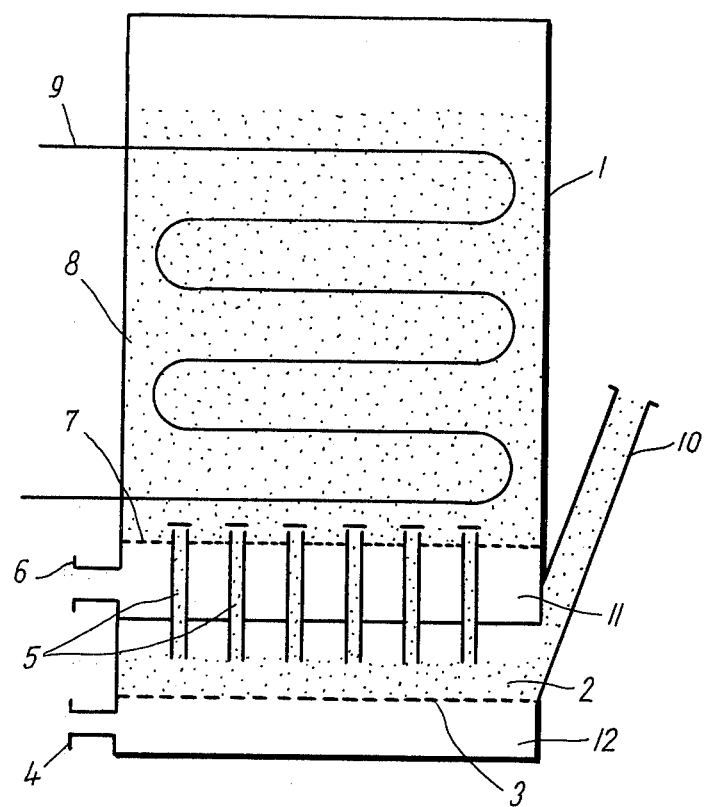

The equipment for feeding particles at multiple points of the fluidized bed comprises (FIG. 1) the fluidized reactor 1, which has the section of a circle or is either four-cornered or multi-angled, and the heat exchanger 9 is located therein. The fluidized reactor 1 is equipped with a particle inlet 10, nozzle 4 for inlet of the fluidizing air into the auxiliary fluidized bed 2 and with nozzle 6 for feeding the fluidizing air into the main fluidized bed 8. The feed of particles can be arranged by the fluidizing bed seal, e.g. arranged according to the copending U.S. patent Application No. 56,846, now issued as U.S. Pat. No. 4,226,835. The fluidized reactor 1 has the grid 7 for the main fluidized bed 8 and the grid 3 for auxiliary fluidized beds 2, while both fluidized beds, i.e. the main 8 and auxiliary 2 mutually interconnected by the system of vertical inlets 5 through which the particles are uniformly introduced from the auxiliary fluidized bed 2 into the main fluidized bed 8 over its whole cross-section area. The air needed for fluidization of the fluidized bed 2 is introduced through the nozzle 4 into the chamber 12. The remaining amount of air, needed for combustion of the fuel, is introduced through the nozzle 6 into the chamber 11 under the grid 7 into the main fluidized bed 8. The arrangement of the grid 7 of the main fluidized bed 8 can vary. It is advantageous to use such arrangements which enable introduction of the fluidizing fluid at different heights of the fluidized bed. Other arrangements of the system of vertical inlets 5 are obvious from FIG. 2, where these vertical inlets are mutually interconnected on the sides and in the center. Other possibilities of arrangement of vertical inlets 5 exist, where they are separated so that independent auxiliary fluidized beds form while each separated system of inlets is equipped with a separated fluidized bed seal for the inlet of fuel or particles.

The method and equipment for feeding the particles at multiple points of the fluidized bed are described in the following examples.

EXAMPLE 1

Figure 2:
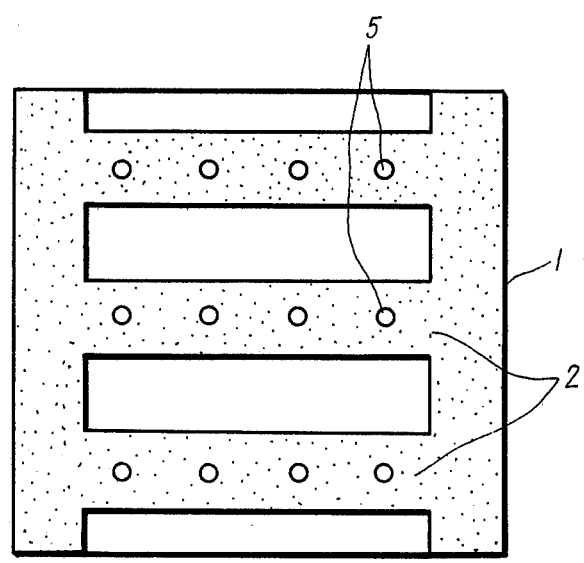
FIG. 2 is a plan view of alternative equipment where individual auxiliary fluidized beds are mutually interconnected.

In the fluidized combustor schematically shown in FIG. 1, solid fuel was burned with the content of 3% of sulphur, delivered into the equipment by the inlet 10. This fuel was uniformly distributed over the whole cross-sectional area by use of the auxiliary fluidized bed 2. Cold air needed for fluidization of the fuel in the auxiliary fluidized bed 2 was introduced into the fluidized bed through the grid 3 and into the chamber below the grid 3 through the nozzle 4. From the auxiliary fluidized bed 2, the fuel was carried out by air which, from the surface of the fluidized bed 2, had passed together with fuel through the system of vertical inlets 5 into the main fluidized bed 8. Since the amount of air needed for combustion was greater than the amount of air needed for fluidization of the auxiliary bed 2, the remaining amount of air was introduced through the pipe 6 into the chamber below the grid 7 of the main fluidized bed 8. The heat liberated by combustion of the fuel in the fluidized bed 8 was removed by the heat exchanger 9. With regard to the random and fast fluctuation of the fluidized bed 2, the feeding of particles of the fuel into the fluidized bed 8 was completely uniform over the entire cross-sectional area of the fluidized bed 8. It was experimentally determined that the cross-sectional area of the inlet tubes 5 must be smaller than 10% of the horizontal cross-sectional area of the fluidized bed 8.

EXAMPLE 2

For combustion and desulphurization of liquid wastes in fluidized combustion, the equipment used was similar to that which was described in Example 1. The liquid waste which contained 26% sulphur was sprayed into the fluidized bed through nozzles which were situated in the side walls of the fluidization reactor 1 surrounding the fluidized bed. Calcium carbonate was delivered into the unit through the throat 10. Its amount was equal to one and one-half of the stoichiometrically needed amount of carbonate. As the individual vertical inlets 5 of particles from the fluidized bed 2 into the fluidized bed 8 were 0.6 m apart, the carbonate was added into each of the series of inlets 5 separately in parallel auxiliary fluidized beds which were 0.1 m wide. All fluidized beds for individual sets of carbonate inlets 5 were transversely interconnected both at the walls and in the center of the unit so that there was a constant height of the bed above each inlet 5 of the carbonate.

The total cross-sectional area of all auxiliary fluidized beds was 15% of the cross-sectional area of the main fluidized bed and through them passed 15% of the total amount of fluidization fluid.

What is claimed is:

1. Apparatus for feeding solid particles at multiple points of a fluidized bed, comprising:
   a housing means having a main chamber for formation of a main fluidized bed of solid particles therein,
   the bottom of said main chamber comprising a main grid for the distribution of a fluidization fluid to said main fluidized bed;
   said housing means having a first space below and communicating with said main grid for receiving a fluidization fluid;
   an inlet to said first space for introduction of a fluidization fluid thereto;
   said housing means having an auxiliary chamber below said first space for formation of an auxiliary fluidized bed of solid particles therein,
   the bottom of said auxiliary chamber comprising an auxiliary grid for the distribution of a fluidization fluid to said auxiliary fluidized bed;
   an inlet to said auxiliary chamber for introduction of solid particles thereto;

said housing means having a second space below and communicating with said auxiliary grid for receiving a fluidization fluid;

an inlet to said second space for introduction of a fluidization fluid thereto; and a system of inlet pipes extending between said auxiliary chamber and the lower portion of said main chamber for transporting said solid particles from the auxiliary fluidized bed to the main fluidized bed.

2. An apparatus according to claim 1, comprising at least two chambers for formation of auxiliary fluidized beds, said two chambers being mutually interconnected.

3. An apparatus according to claim 2, wherein the total of the cross-sectional areas of the auxiliary fluidized beds is less than or equal to the cross-sectional area of the main fluidized bed.

4. An apparatus according to claim 1, wherein said system of inlet pipes has a total cross-sectional area equal to less than 10% of the horizontal cross-sectional area of the main fluidized bed.

* * * * *